US012808462B2

(12) United States Patent
Lafrance et al.

(10) Patent No.: US 12,808,462 B2
(45) Date of Patent: Nov. 24, 2026

(54) ROTATABLE CABLE HOLDER

(71) Applicant: ADDÉNERGIE TECHNOLOGIES INC., Québec City (CA)

(72) Inventors: Denis Lafrance, Québec (CA); François Perreault, Lévis (CA)

(73) Assignee: ADDÉNERGIE TECHNOLOGIES INC., Québec City (CA)

( * ) Notice: Subject to any disclaimer, the term of this patent is extended or adjusted under 35 U.S.C. 154(b) by 159 days.

(21) Appl. No.: 18/423,506

(22) Filed: Jan. 26, 2024

(65) Prior Publication Data

US 2025/0243950 A1 Jul. 31, 2025

(51) Int. Cl.

| | |
|---|---|
| ***F16L 3/10*** | (2006.01) |
| ***B60L 53/18*** | (2019.01) |
| ***B60L 53/302*** | (2019.01) |
| ***F16L 7/00*** | (2006.01) |
| ***H02G 3/04*** | (2006.01) |

(52) U.S. Cl.

CPC ............. *F16L 3/1091* (2013.01); *B60L 53/18* (2019.02); *B60L 53/302* (2019.02); *F16L 7/00* (2013.01); *H02G 3/04* (2013.01)

(58) Field of Classification Search

CPC ...... B60L 53/18; B60L 53/302; F16L 3/1091; F16L 7/00; H02G 3/04; Y02T 10/70; Y02T 10/7072; Y02T 90/14

See application file for complete search history.

(56) References Cited

U.S. PATENT DOCUMENTS 5,304,075 A 4/1994 Hoffman
5,755,588 A 5/1998 Sweatman et al.
6,717,055 B2 4/2004 Kato
7,645,938 B2 1/2010 Kogure et al.
9,059,578 B2 6/2015 Sokolowski et al.
10,761,285 B2 9/2020 Courchaine et al.
10,781,849 B2 9/2020 Tonapi et al.
11,462,897 B2 10/2022 Marchek et al.
2014/0151514 A1 6/2014 Asai

FOREIGN PATENT DOCUMENTS

JP 2003168517 A 6/2003
JP 2018025059 2/2018

OTHER PUBLICATIONS

Gotz et al (DE 102018125009) (Year: 2020).*
SVI Inc; Retractor Clamp for 1-3/16" OD Hose / Cable; https://www.sviinternational.com/part/bp-1394-98/; Date accessed May 9, 2023.

* cited by examiner

*Primary Examiner* — Lawrence D Ferguson
(74) *Attorney, Agent, or Firm* — Rowand LLP

(57) ABSTRACT

A cable holder for manipulating electric vehicle (EV) charging cables in EV charging stations. The cable holder includes a housing defining a primary interior slot and a primary coupler disposed therein. The primary coupler includes an exterior collar, a rigid portion, and a compressible portion. The exterior collar couples the primary coupler to the housing by engaging the primary interior slot, the exterior collar being rotatable within the primary interior slot. The rigid portion has gripping features for gripping a cable. The compressible portion is situated between the exterior collar and the rigid portion and couples the exterior collar to the rigid portion to allow the cable to rotate within the housing.

18 Claims, 7 Drawing Sheets

ROTATABLE CABLE HOLDER

TECHNICAL FIELD

The present application relates to cable holders, and more particularly, to cable holders for positioning, rotating, and manipulating electric vehicle (EV) charging cables in cable management systems (CMS) for EV charging stations.

BACKGROUND

An electric vehicle (EV) charging cable is a component of an EV charging station that supplies direct current (DC) or alternating current (AC) electric energy for the recharging of EVs, such as plug-in battery EVs, including electric cars, trucks, buses, and other vehicles including high and low range vehicles and plug-in hybrids.

Electric vehicle users often wish to rapidly charge such vehicles, and to accommodate such users some EV charging stations are high voltage charging stations which deliver high power to the electrical vehicle during charging. For example, some chargers, which are often referred to as level 3 or Direct Current Fast Chargers (DCFC) may deliver up to 350 kW of power at around 400 volts direct current (VDC). Even faster charging is possible with yet higher voltage and power capabilities.

One challenge with electric vehicle chargers, which is acute with high-speed chargers, is cable management. As voltage and power requirements of chargers increase, the size of cabling required to connect the EV charger to the EV also increases. Some users may find the cabling difficult or impossible to use and the cabling may be problematic for those with disabilities. It may be difficult to improve charging capabilities for some chargers while ensuring accessibility and compliance with requirements, such as the Americans with Disabilities Act.

Further, charging cables for EV chargers that are simply left in an extended position on the ground may present hazards. For example, such charging cables may be a tripping hazard and/or such charging cables may be an electrical safety hazard. For example, when lying on the ground, a cable may be damaged by a vehicle. In some climates, there is also a possibility that charging cables that are left on the ground in place after charging may be covered by snow or may freeze to the ground or they may be hit or caught by a snowplow.

Liquid-cooled high-power charging cables may be particularly difficult for users to manage since such cables are usually large, not very flexible, and manipulation may be difficult.

A cable management system (CMS) may be useful to help manipulate EV charging cables such as liquid-cooled charging cables. Some CMS systems may need an attachment point on the charging cable. The attachment point may be called a cable holder or clamp. Current cable holders hinder or constrain the movements of charging cables, particularly for liquid-cooled charging cables, and reduce their range and the smooth operation of the CMS.

Thus, there is a need for improved EV charging cable holders that address one or more of these problems or other problems.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
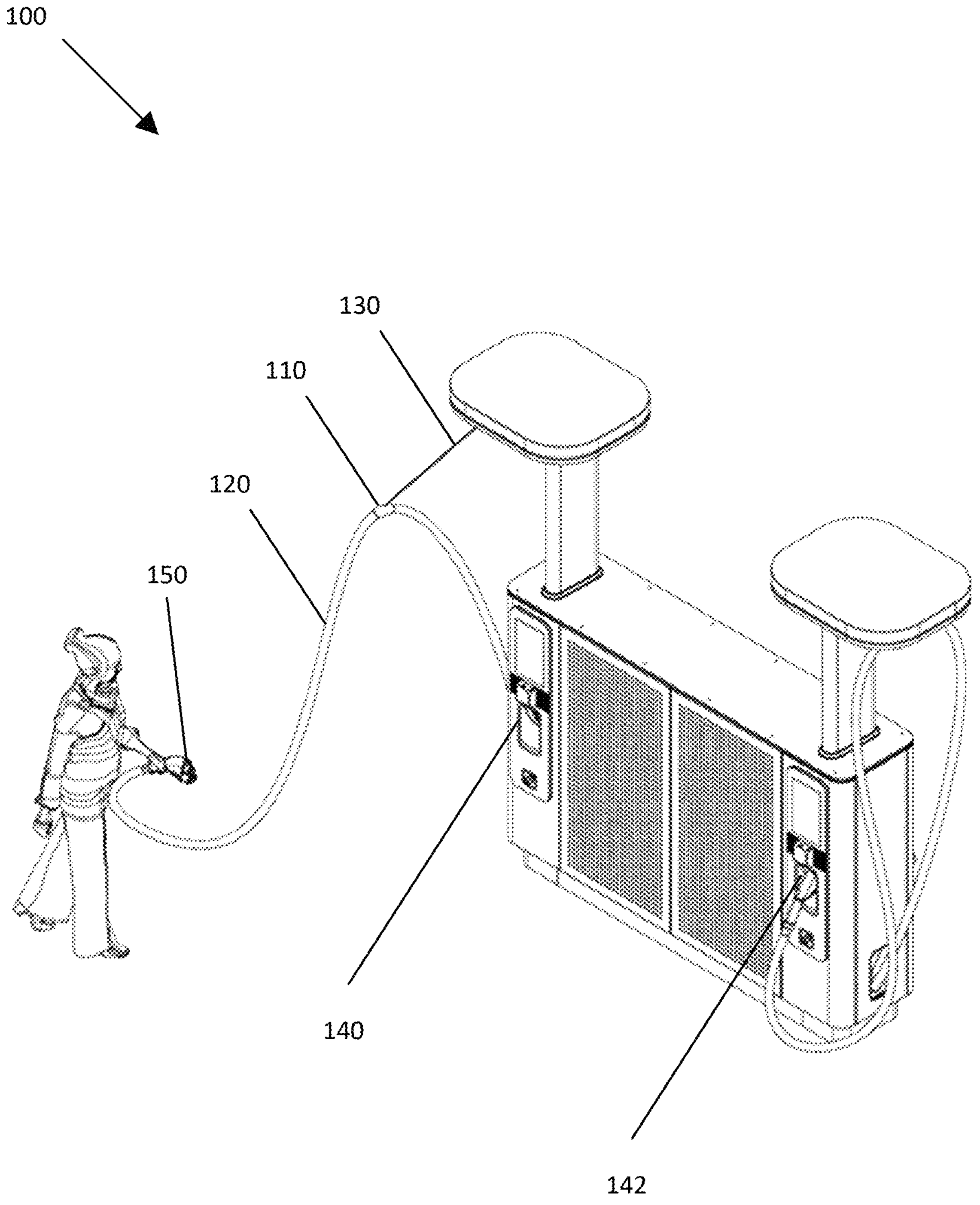
FIG. 1 is a perspective view of a cable management system including a rotatable cable holder in accordance with an example of the present application.

In one aspect, the present application describes a cable holder. The cable holder may include a housing. The housing may define a primary interior slot. The cable holder may further include a primary coupler. The primary coupler may be disposed within the housing. The primary coupler may include an exterior collar for coupling the primary coupler to the housing by engagement with the primary interior slot. The exterior collar may be rotatable within the primary interior slot. The primary coupler may further include a rigid portion. The rigid portion may have one or more gripping features for gripping a cable. The primary coupler may further include a compressible portion. The compressible portion may be situated between the exterior collar and the rigid portion. The compressible portion may be for coupling the exterior collar to the rigid portion to allow the cable to rotate within the housing.

In some implementations, the gripping features may include one or more of: barbs, spikes, teeth, claws, and notches.

In some implementations, the housing may include a first housing piece and a second housing piece.

In some implementations, the exterior collar may include a first exterior collar piece and a second exterior collar piece to allow the exterior collar to be placed around the cable.

In some implementations, the rigid portion may include a first rigid piece and a second rigid piece to allow the exterior collar to be placed around the cable.

In some implementations, the compressible portion may include a first compressible portion and a second compressible portion.

In some implementations, the first and second exterior collar pieces may include a tightening feature for tightening the first and second exterior collar and fix the rigid portion to the first and second exterior collar by compressing the compressible portion.

In some implementations, the compressible portion may be constructed with one or more of: silicone and rubber.

In some implementations, an inner diameter of the rigid portion may correspond to an outer diameter of the cable.

In some implementations, the primary coupler may be situated in a middle of the housing.

In some implementations, a first secondary coupler may be situated at a first end of the housing. The first secondary coupler may be rotatably coupled to the housing at a first interior slot. The first secondary coupler may define a first interior hole for receiving the cable.

In some implementations, a second secondary coupler may be situated at a second end of the housing. The second secondary coupler may be rotatably coupled to the housing at a second interior slot. The second secondary coupler may define a second interior hole for receiving the cable.

In some implementations, the secondary couplers may each include a first secondary coupler piece and a second secondary coupler piece to allow the secondary couplers to be placed around the cable.

In some implementations, the secondary couplers may include a linking mechanism to couple the first secondary coupler piece and the second secondary coupler piece.

In some implementations, the first secondary coupler and the second secondary coupler include one or more gripping features for gripping the cable.

In some implementations, the cable holder may include a cap defining a hole for attaching a mechanical wire to the cable holder. The housing may further include a cap connector coupled to the cap.

In some implementations, the cable holder may include a first cap piece, a second cap piece, a plate defining a plate hole for attaching the mechanical wire, and fasteners to fasten the first cap piece, the second cap piece, and the plate.

In some implementations, the housing, the exterior collar, the rigid portion, and the compressible portion of the primary coupler may be tubular.

In some implementations, the cable may be liquid cooled or air cooled.

In another aspect, an EV charging station is described. The EV charging station may include a mechanical wire. The EV charging station may include a cable management system for retracting and extending the mechanical wire. The EV charging station may include an EV charging cable. The EV charging station may include a cable holder of a type described herein. For example, a cable holder may include: a housing defining a primary interior slot; a primary coupler disposed within the housing, the primary coupler including: an exterior collar for coupling the primary coupler to the housing by engagement with the primary interior slot, the exterior collar being rotatable within the primary interior slot; a rigid portion having one or more gripping features for gripping a cable; and a compressible portion situated between the exterior collar and the rigid portion for coupling the exterior collar to the rigid portion to allow the cable to rotate within the housing.

In yet another aspect, a cable management system is described. The cable management system may include a mechanical wire and an actuator for selectively extending and retracting the mechanical wire. The cable management system may include a cable holder of a type described herein. For example, a cable holder may include: a housing defining a primary interior slot; a primary coupler disposed within the housing, the primary coupler including: an exterior collar for coupling the primary coupler to the housing by engagement with the primary interior slot, the exterior collar being rotatable within the primary interior slot; a rigid portion having one or more gripping features for gripping a cable; and a compressible portion situated between the exterior collar and the rigid portion for coupling the exterior collar to the rigid portion to allow the cable to rotate within the housing.

In another aspect, the EV charging station includes a mechanical wire. The station further includes a cable management system for retracting and extending the mechanical wire. The station further includes an EV charging cable. The station further includes a cable holder.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure relates to a cable holder or alternatively, a cable clamp, as an attachment to a cable management system (CMS) in electric vehicle (EV) charging stations for assisting with manipulating EV charging cables. In particular, it may be an improvement on cable holders for positioning, rotating, and manipulating liquid-cooled EV charging cables.

The charging ports of electric vehicles are not uniformly or universally displaced between each vehicle or vehicle manufacturer. For example, the charging port a Tesla Model 3™ is located on the rear left-hand side of the car, whereas a Nissan LEAF™ has the charging port on the front middle bonnet of the car. Accordingly, it may be difficult to manipulate and place the EV charger into the charging port of the EV if the EV charging cable is difficult to maneuver.

Cable holders for cable management systems are generally not well-suited for liquid-cooled EV charging cables. Cable holders may squeeze, pinch, or clamp the liquid-cooled EV charging cables too tightly causing disruptions or damage thereto.

Therefore, there is a need to create a cable holder that attaches to a specific point on EV charging cables, such as liquid-cooled EV charging cables, that does not slide along the charging cable and does not squeeze the charging cable too tightly as to damage it.

FIG. 1 illustrates a perspective view of an EV charging station 100. The EV charging station 100 may also be referred to herein as a charging station. The EV charging station 100 may include one or more EV chargers. In the illustrated example, the EV charging station 100 includes two EV chargers-a first EV charger 140 and a second EV charger 142. In other implementations, the EV charging station 100 may include a greater or lesser number of EV chargers than the EV charging station 100 of FIG. 1.

The EV charger 140 may include a cable 120, a connector 150, and a cable holder 110. The cable 120 may be relatively long and/or relatively thick. A cable 120 that is long allows an operator greater flexibility for positioning their electric vehicle in a way that allows for physical connection between the connector 150 and the charging port of an EV (not shown). In some implementations, the charging cable may be 10 feet or greater in length. In some implementations, the charging cable may be at least 20 feet long.

The thickness of the charging cable may, in some implementations, allow for high-speed charging of the EVs. For example, a thicker charging cable may carry thicker wires, or it may have a greater number of conductors than a relatively thinner charging cable which may allow the charging cable to deliver more power to the EV in order to reduce the charge time.

The length and/or thickness of the charging cable may make the cable 120 difficult to use for at least some operators. For example, the charging cable may be relatively heavy, and an operator may find it difficult to extend the charging cable to allow for connection of the connector 150 and the charging port of an EV. In order to make the charging cable easier to extend or retract, the EV charging station 100 may include one or more cable management systems (CMSs). Further, the CMSs may include or be attached to one or more cable holders to help manipulate the EV charging cables, examples of which will be described in greater detail below.

In FIG. 1, the CMS includes a mechanical wire 130 that is coupled to a charging cable holder 110 which is further coupled to a cable 120 associated with the EV charger 140. In the illustrated example of FIG. 1, only one mechanical wire 130 is visible. The EV charging station may include more than one mechanical wire 130. For example, the EV charger 140 may be associated with a separate mechanical wire which is used for retracting and/or extending an associated charging cable. In the illustrated example, the mechanical wire 130 that is visible is shown in a partially extended state, which may also be referred to as a partially retracted state. This mechanical wire 130 is connected to a cable holder 110 which is further connected to a cable 120. The cable holder 110 may fixedly and/or rotatably connect to an end of the mechanical wire 130 to the cable 120.

The CMS may, when a charging cable is not in use, retract the charging cable by retracting an associated mechanical wire 130. More specifically, the mechanical wire 130 may be drawn into an enclosure associated with the EV charging station 100. When an operator pulls on the cable 120, the CMS may provide additional slack to the cable 120 by extending the mechanical wire 130 from the enclosure. The retraction and extension of the mechanical wire 130 controls the amount of slack in the cable 120. Put differently, the retraction and extension of the mechanical wire 130 controls how far the connector 150 of a connected charging cable can be moved relative to a stationary portion of the EV charging station 100.

The CMS may retract and extend the mechanical wire 130 using an actuator. That is, the CMS may include an actuator which selectively retracts or extends the mechanical wire 130. The actuator may be, for example, a drum for winding the mechanical wire and a motor for rotating the drum.

In the illustrated example, the CMS draws the mechanical wire 130 in from overhead. Put differently, the mechanical wire 130 extends out of the enclosure at a top end of the enclosure. In this orientation, the mechanical wire 130, when retracted, lifts at least a portion of the cable 120 away from the ground.

Figure 2:
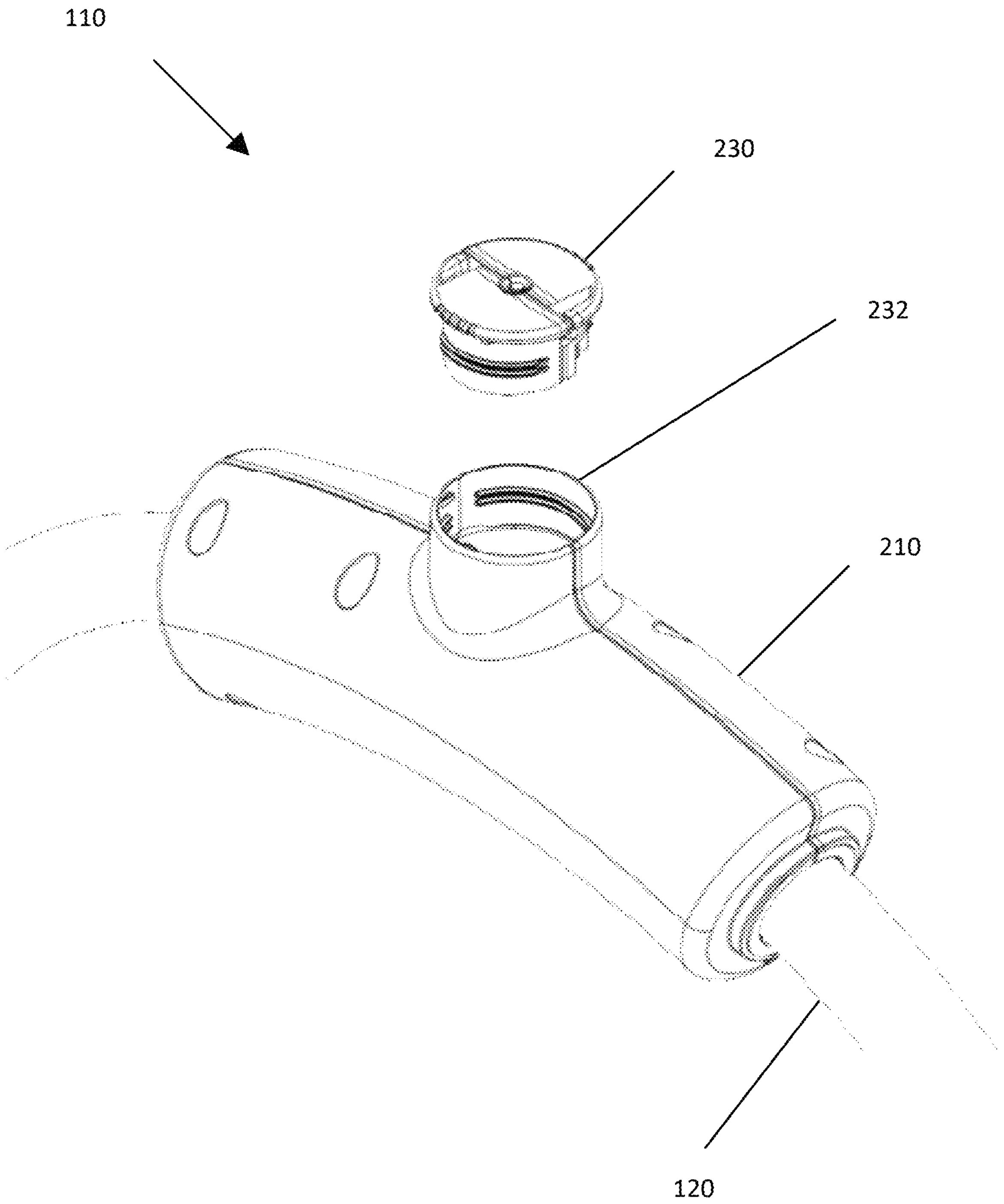
FIG. 2 is a perspective view of a rotatable cable holder in accordance with an example of the present application.

FIG. 2 illustrates a perspective view of an example of a cable holder 110 for electric vehicles (EV). The cable holder 110 may also be referred to as a cable clamp or a cable attachment.

The cable holder 110 may be configured to be installed on-site. For example, the cable holder may be arranged to be attached to the mechanical wire 130 after the EV charging station 100 and/or the CMS have already been installed. Further, the cable holder may be arranged to be attached to the cable 120 on site. This allows the cable holder 110 and/or the cable 120 to be easily replaced on site and it allows the cable holder 110 to be installed in a way that may be adapted to site conditions. For example, at some installations, the cable holder 110 may be connected at a different location on the cable 120 than at other installations.

The cable holder 110 may include a housing 210. The cable holder 110 may include a cap 230. The cable holder 110 may include a cap connector 232. The cap connector 232 may also be referred to as a socket. The cap 230 may be detachably connected to the cap connector 232. For example, the cap 230 may be securely screwed or fitted into or on the cap connector 232. In at least some implementations, the cap connector 232 may be a threaded connector. The cap 230 may be connected to a mechanical wire 130. The cap 230 may be detached from the cap connector 232 in order to connect the mechanical wire 130 to the cap 230. Then, once connected, the cap 230 may be attached to the cap connector 232. This may allow for connection of the cable holder 110 to the mechanical wire 130 on site.

The cable holder 110 may be constructed of entirely or partially of plastic, rubber, silicon, or any suitable metal, such as aluminum.

The cable holder 110 may be attached to a cable 120. Such attachment may be performed on site.

The cable 120 may be a regular EV charging cable, a fast-charging EV cable, or a liquid-cooled or air-cooled EV charging cable. The cable 120 may be of any radius or diameter. The cable 120 may be of any length. The cable 120 may be of any weight. The cable 120 may be of any type, such as Type 1 (J1772), Type 2 (Mennekes), CHAdeMO, CCS (Combined Charging System), Tesla Connector, GB/T (GBT) and Supercharger Connector.

The cable holder 110 may be attached anywhere along the cable 120. The cable holder 110 may, in some implementations, be attached midway along the cable 120. In some implementations, the cable holder 110 may be attached near the connector 150. In some implementations, the cable holder 110 may be attached near the proximal or the distal end of the cable 120.

The cap 230 may be connected to a mechanical wire 130 of a cable management system (CMS) of an EV charging station 100. The cap 230 coupled to the cap connector 232 may permit the mechanical wire 130 to pull and release the cable holder 110 attached to the cable 120. Accordingly, the cable 120 may have a larger degree of or more motion than if the cable 120 were not attached to the cable holder 110.

Figure 3:
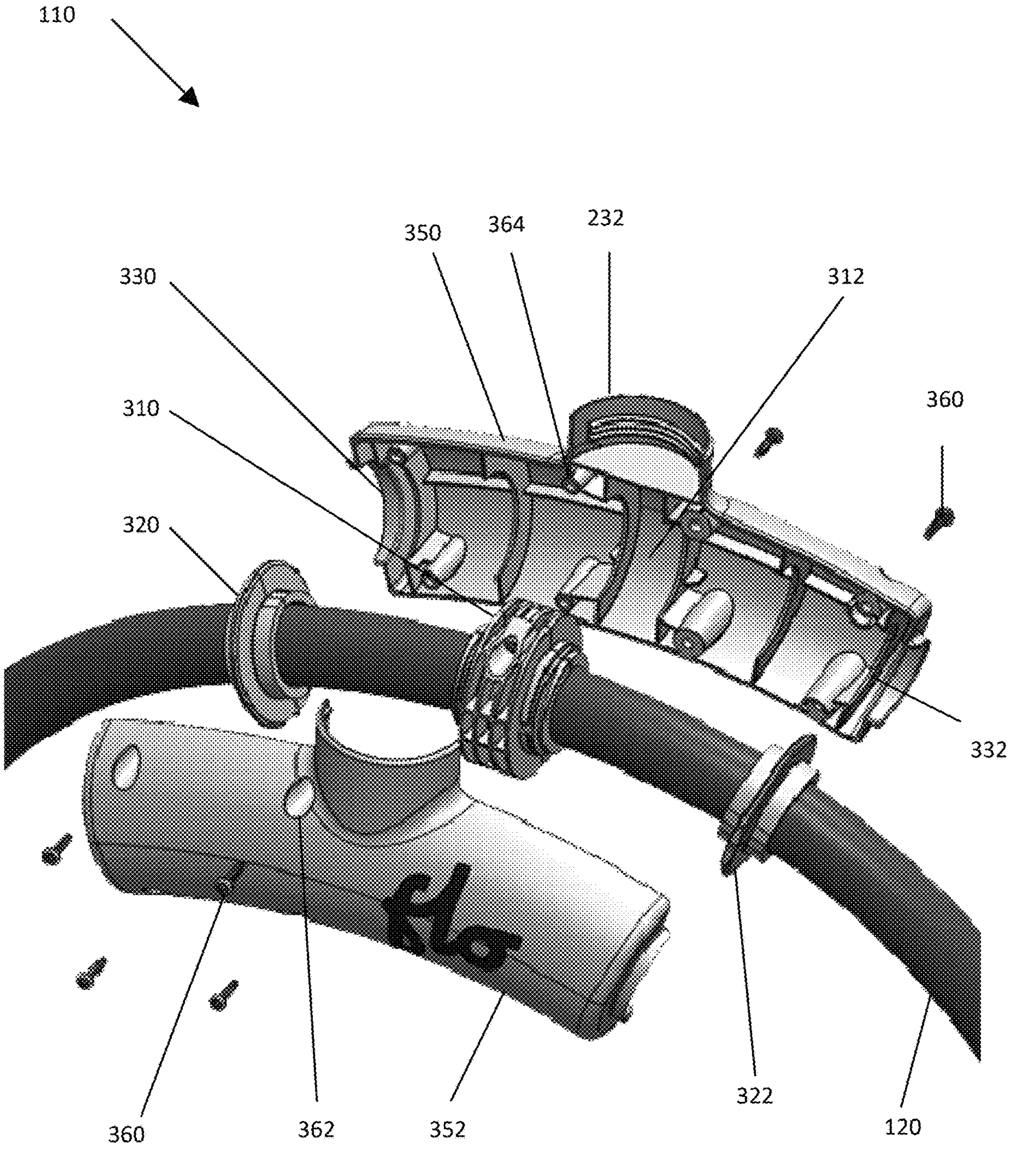
FIG. 3 is an exploded view of a rotatable cable holder of FIG. 2 in accordance with an example of the present application.

FIG. 3 illustrates an exploded view of an example of a cable holder 110 from FIG. 2. The cable holder 110 may include a housing 210. The housing 210 may be a multi-piece housing such as a two-piece housing. For example, the housing 210 may include a first housing piece 350 and a second housing piece 352. The first housing piece 350 and the second housing piece 352 may be coupled together to form the housing 210 with an interior cavity for the cable 120. The interior cavity may also be referred to as an interior hole or passage. The housing 210 may be tubular or cylindrically shaped. The housing may have a circular cross section, in at least some implementations.

The first housing piece 350 and the second housing piece 352 may be affixed together by one or more fasteners. The fastener(s) may include one or more of: screws, nuts, bolts, washers, rivets, clips and clamps, pins, anchors, nails, soldering and welding, and adhesives. The first housing piece 350 and the second housing piece 352 may be affixed together by the fastener(s) 360. The first housing piece 350 may define a first through hole 362 for receiving a first one of the fasteners 360. The second housing piece 352 may define a second through hole 364 for receiving a second one of the fasteners 360. Accordingly, the housing 210 may include a plurality of through holes to receive fasteners to couple the first and second housing pieces 350, 352.

The housing 210 may include a primary interior slot 312. That is, a primary interior slot 312 may be defined in the housing 210. The primary interior slot 312 may receive a primary coupler 310. The primary interior slot 312 may be positioned anywhere in the housing 210. In one implementation, the primary interior slot 312 may be positioned at the middle or near the middle of the housing 210. The primary interior slot 312 may be a track such as, for example, a cylindrical track. The primary coupler 310 may be configured to engage the track. That is, the primary coupler 310 may rotate along the track so that the cable 120 may rotate relative to the housing 210.

The cable holder 110 may include the primary coupler 310. The primary coupler 310 may be disposed in the interior of the housing 210. For example, the primary coupler 310 may be disposed in the primary interior slot 312.

The housing 210 may include a first interior slot 330 and a second interior slot 332. Put differently, the housing 210 may define the first interior slot 330 and the second interior slot 332. The first interior slot 330 and the second interior slot 332 may be shaped to fit secondary couplers. For example, the first interior slot 330 and the second interior slot 332 may be shaped to fit a first secondary coupler 320 and a second secondary coupler 322, respectively. The first interior slot 330 and the second interior slot 332 may be tracks such as cylindrical tracks. The first secondary coupler 320 and the second secondary coupler 322 may be configured to engage the track. That is, the secondary couplers 320, 322 may rotate along the tracks provided by the first interior slot 330 and the second interior slot 332.

The multi-piece construction of the housing may allow one or more of the primary coupler 310, the first secondary coupler 320 and the third secondary coupler 322 to be inserted within the housing 210 on site. For example, the couplers may be attached to the cable onsite and then inserted within the housing 210 while the first and second housing pieces are detached from one another. Then, the first and second housing pieces may be attached to one another to secure the couplers (and the cable 120) within the housing 210.

The first interior slot 330 may be situated at a first end of the housing. The second interior slot 332 may be situated at a second end of the housing, the second end of the housing opposing the first end of the housing in the longitudinal direction.

The cable holder 110 may include a first secondary coupler 320 and a second secondary coupler 322. The first secondary coupler 320 may be rotatably coupled to the housing at the first interior slot 330. The second secondary coupler 322 may be rotatably coupled to the housing at the second interior slot 332.

The primary coupler 310, the first secondary coupler 320 and the second secondary coupler 322 may be rotatable while disposed within the primary interior slot 312, the first interior slot 330 and the second interior slot 332. The ability to rotate may permit the cable 120 to be manipulated without much difficulty.

The first secondary coupler 320 and the second secondary coupler 322 may be identical. The second secondary coupler 320 may be a rotated version of the first secondary coupler 320.

Figure 4:
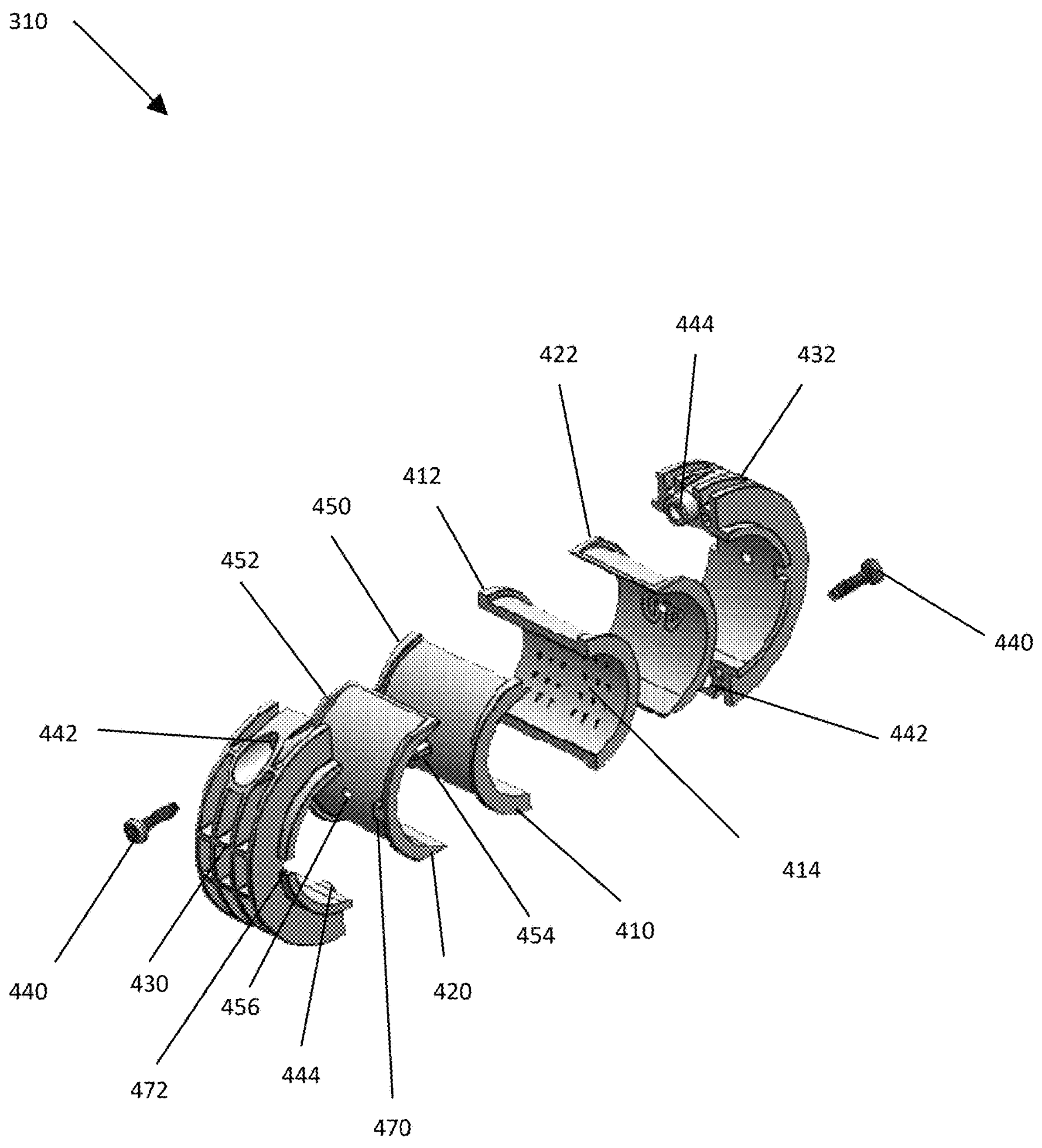
FIG. 4 is an exploded view of the primary coupler of FIG. 3.

FIG. 4 illustrates an exploded view of an example of a primary coupler 310. The primary coupler 310 may include an exterior collar, a compressible portion (420, 422), and a rigid piece (410, 412). The primary coupler may also include a tightening mechanism to couple the exterior collar, the compressible portion, the rigid portion and the cable 120.

The tightening mechanism may be used to secure or fasten the exterior collar, the compressible portion (420, 422), the rigid piece (410, 412), and the cable 120 together by reducing looseness, play or slack. The tightening mechanism may include fasteners such as screws, adhesives, and welding. The tightening mechanism may also be referred to as a tightening feature.

The exterior collar may include a first exterior collar piece 430 and a second exterior collar piece 432. The compressible portion may include a first compressible portion 420 and a second compressible portion 422. The rigid portion may include a first rigid piece 410 and a second rigid piece 412. The rigid portion may be constructed of a rigid material. The rigid material may be a material that is not compressible. The rigid material may be, for example, a plastic or metal.

The interior side of the first rigid piece 410 and the second rigid piece 412 may include gripping features 414 for gripping the cable 120. The gripping features may be or include protrusions. For example, the protrusions, or other gripping features, may be constructed from one or more of: barbs, spikes, teeth, claws, and notches. The protrusions, or other gripping features, may be lined on the interior side of the circumferential wall of the rigid portion. The gripping features 414 may grip the cable 120 so that the rigid portion does not slide along the cable 120 even when force is applied. The gripping features 414 may, in at least some implementations, be constructed of a rigid material.

The exterior collar may be constructed of a rigid material to not be compressible. The exterior collar may be adjacent to the primary interior slot 312 of the housing 210. The compressible portion (420, 422) may be compressed by the exterior collar and the rigid portion. The compressible portion (420, 422) may be constructed of a compressible material. For example, the compressible portion may be constructed of silicone, rubber and/or materials. In some implementations, the compressible portion may be constructed of rubber.

The compressible portion (420, 422) may be of a thickness that allows the compressible portion to be compressed when the exterior collar is fastened using the tightening mechanism. That is, a gap between the rigid piece (410, 412) and the exterior collar when the exterior collar is fastened using the tightening mechanism, may be smaller than the resting thickness of the compressible portion. In this way, the compressible portion is compressed between the rigid portion and the exterior collar when the exterior collar is fastened using the tightening mechanism.

The compressible portion may serve one or more of a number of functions. For example, the compressible portion (420, 422) may fasten the exterior collar to the rigid piece (410, 412). That is, the compressing of the compressible portion by the fastening of the exterior collar may effectively bond the rigid piece 410 to the exterior collar. In some implementations, the compressible portion may exert a force on the rigid portion to hold the rigid portion tightly against the cable 120. The rigid portion may have an inner diameter that corresponds to an outer diameter of the cable.

The tightening mechanism may be found on the exterior collar. For example, the tightening mechanism may include screws 440, a first threaded hole 442 and a second threaded hole 444. The tightening mechanism may utilize other fasteners, such as adhesives. Once the tightening mechanism is engaged, the exterior collar, the compressible portion, and the rigid portion may become locked and fixed, and the primary coupler 310 may be fixed at a certain point along the cable 120. Put differently, the primary coupler 310 may not be slidable along the cable 120 and may be held at a fixed location on the cable 120. The cable 120 is not able to slide along the cable holder, but it is rotatable within the cable holder.

The first exterior collar piece 430 and the second exterior collar piece 432 may be identical. For example, the second exterior collar piece 432 may be a rotated copy of the first exterior collar piece 430. This may reduce manufacturing complexity as only one type of exterior collar piece needs to be produced. This may also reduce errors introduced during installation by having mismatched pieces at the worksite.

The primary coupler 310 may have an alignment mechanism to align the exterior collar, the compressible portion, and the rigid portion. The alignment mechanism may prevent the exterior collar, the compressible portion, and the rigid portion from being disengaged, dislodged and/or decoupled. In at least some implementations, the alignment mechanism may prevent two or more of the exterior collar, the rigid portion and the compressible portion from being misaligned. For example, the alignment mechanism may include a post 454 on the surface of the first rigid piece 410. The post 454 may be found on the lateral surface of the first rigid piece 410. The post 454 may extend radially from the center of the first rigid piece. In some embodiments, there may be a plurality of posts on the lateral surface of the rigid portion. Other alignment features may be used in other implementations.

The first compressible portion 420 may include an alignment through hole 456 to receive the post 454. The alignment through hole 456 may be found on the lateral surface of the first compressible portion 420. In some embodiments, there may be a plurality of through holes to receive the plurality of posts on the rigid portion.

The alignment mechanism may include a first set of rails 450 found on the edges of the rigid portion. Put differently, the first set of rails 450 may be found on the top and bottom of the rigid portion. For example, the first set of rails 450 may be found at the first and second side edges of the first rigid piece 410. The first set of rails 450 may enclose or partially enclose the compressible portion. For example, the first set of rails 450 may be found on the first rigid piece 410 and encloses or partially encloses the first compressible portion 420.

The alignment mechanism may include a second set of rails 452 found on the edges of the compressible portion. Put differently, the second set of rails 452 may be found on the top and bottom of the compressible portion. For example, the second set of rails 452 may be found at the first and second side edges of the first compressible portion 420. The second set of rails 452 may enclose or partially enclose the first exterior collar piece 430.

The alignment mechanism may include one or more nodes. A node 470 of the one or more nodes may be found on an edge of the compressible portion. Put differently, the nodes may be found on the top and bottom of the compressible portion. The node 470 may be coupled to a node receiver 472. The node receiver 472 may be found on the first exterior collar piece 430. The nodes may be protrusions.

The alignment mechanism may prevent the exterior collar, the compressible portion, and the rigid portion from rotating amongst each of the other parts. The alignment mechanism may also prevent the exterior collar, the compressible portion, and the rigid portion from sliding off of each of the other pieces.

The first rigid piece 410 and the second rigid piece 412 may be identical to each other. The second rigid piece 412 may be a rotated copy of the first rigid piece 410. The first compressible portion 420 and the second compressible portion 422 may be identical to each other. The second compressible portion 422 may be a rotated copy of the first compressible portion 420.

Figure 5:
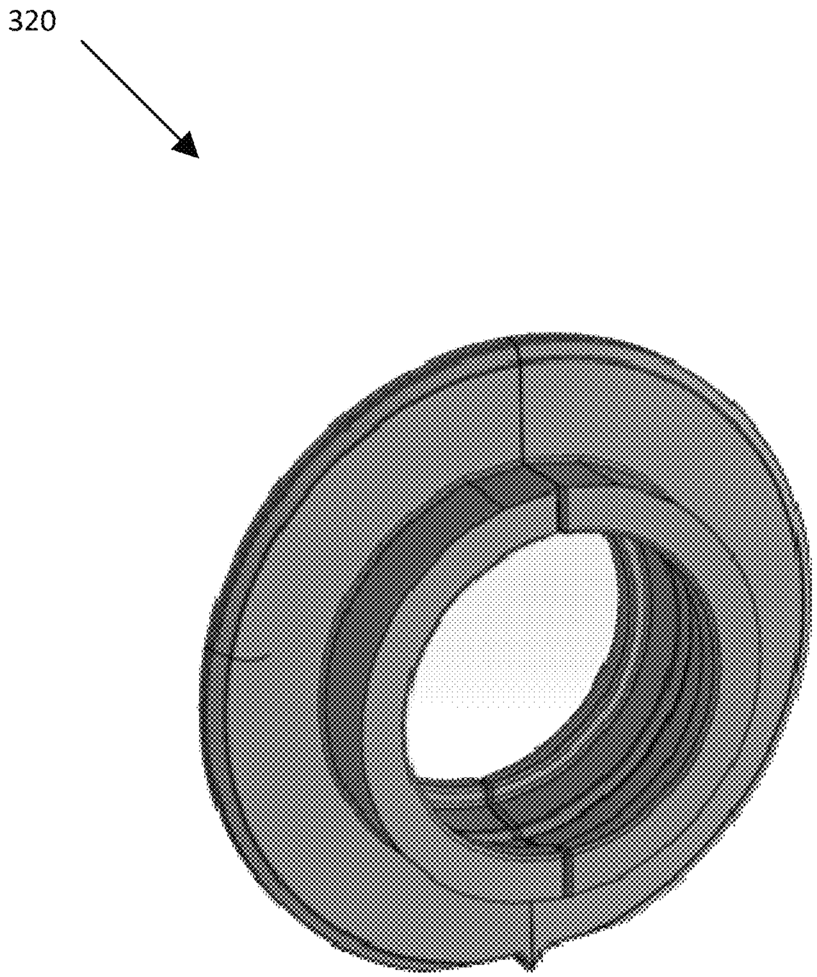
FIG. 5 is a perspective view of the secondary coupler in the closed position of FIG. 3.

FIG. 5 illustrates a perspective view of the first secondary coupler 320 in the closed position. The first secondary coupler 320 may be identical the second secondary coupler 322 found in FIG. 3. The first secondary coupler 320 may be circular defining a through hole for the cable 120. The diameter of the through hole of the first secondary coupler 320 may be the similar to the diameter of the cable 120.

Figure 6:
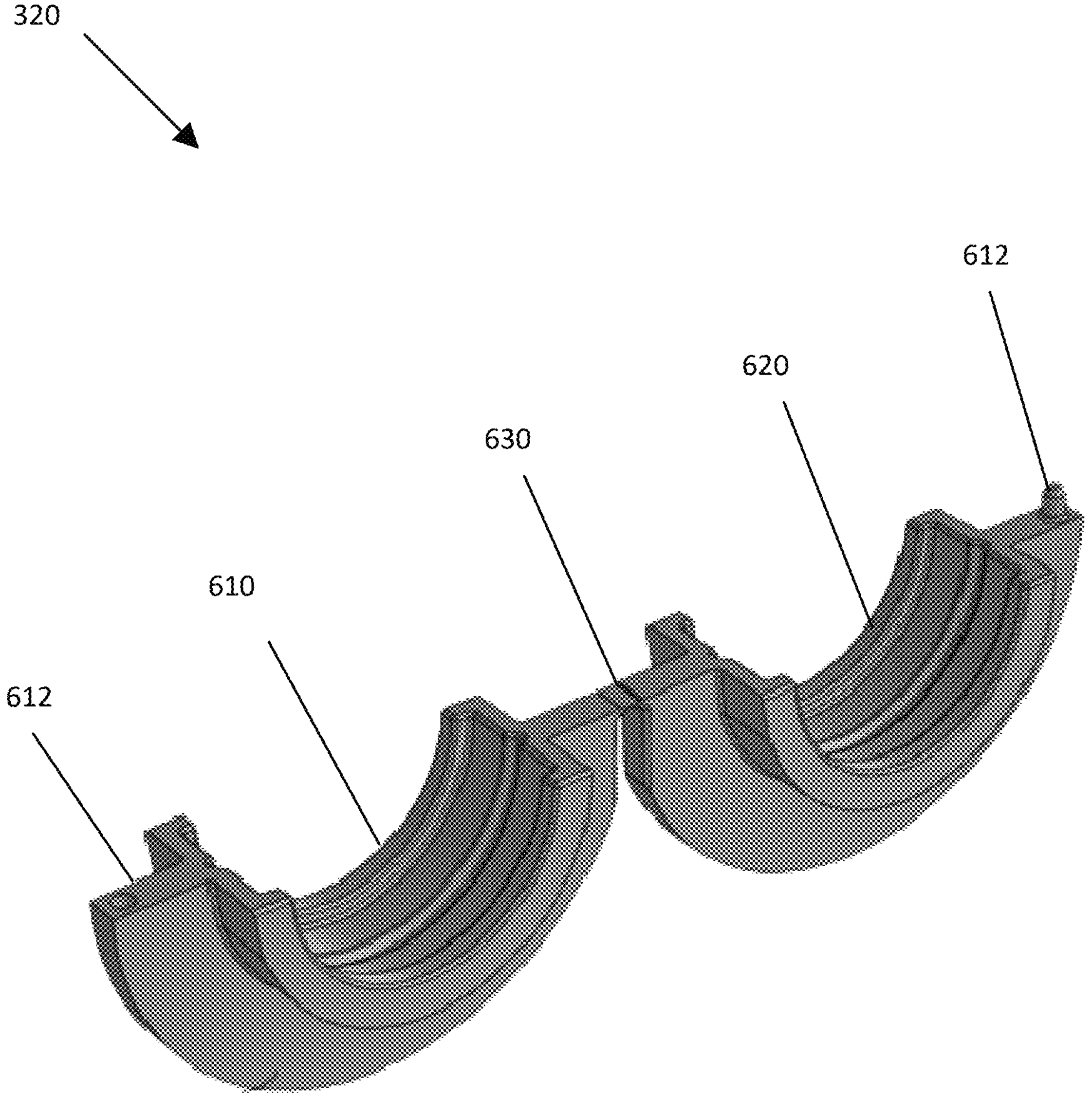
FIG. 6 is a perspective view of the secondary coupler in FIG. 4 in the open position.

FIG. 6 illustrates a perspective view of the first secondary coupler 320 in the opened position. The first secondary coupler may be opened to receive the cable 120.

The secondary couplers may include a hinged connection. For example, the first secondary coupler 320 may include a first secondary coupler piece 610, a second secondary coupler piece 620 and a hinge 630 adjoining the first secondary coupler piece 610 and the second secondary coupler piece 620. The hinge 630 may be a strip connecting the first secondary coupler piece 610 and the second secondary coupler piece 620.

The first secondary coupler 320 may have a linking mechanism 612 to prevent the first secondary coupler 320 from going from the closed position to the opened position and/or for ensuring that the coupler remains circumferentially aligned. The linking mechanism 612 may include a boss and a boss receiver. The linking mechanism 612 may include a protrusion and an indentation receiving the protrusion.

In at least some implementations, the linking mechanism 612 of first secondary coupler 320 may include a second protrusion and a second indentation for receiving the second protrusion (not shown) instead of the hinged connection or in place of the hinge 630. In some cases, the second linking mechanism may be a diameter length of the first secondary coupler 320 apart from the protrusion and the indentation.

The interior wall of the first secondary coupler 320 may include one or more gripping features, such as projections or protrusions, for gripping the cable 120.

Figure 7:
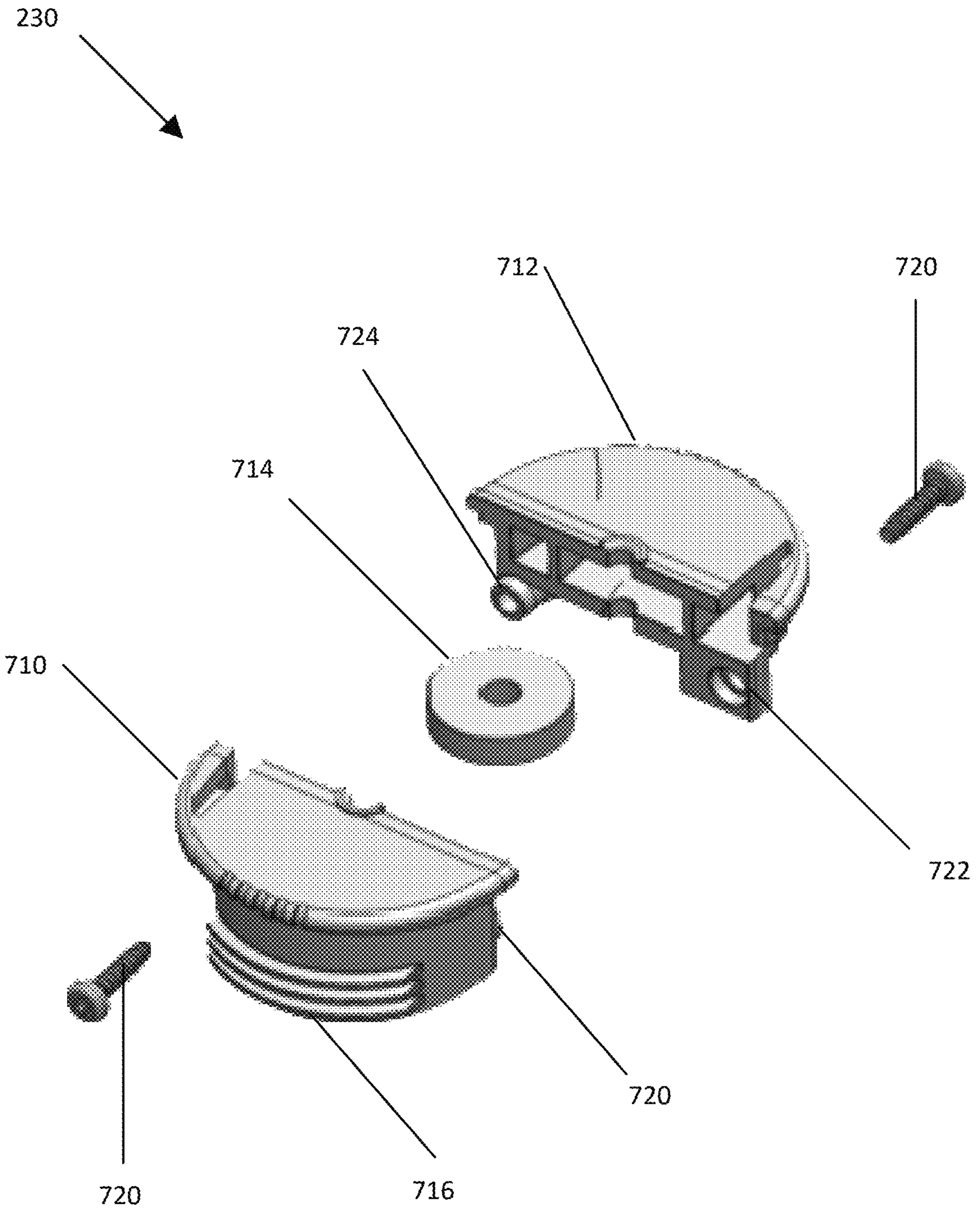
FIG. 7 is an exploded view of the cap of FIG. 2.

FIG. 7 illustrates an exploded view of the cap 230. The cap 230 may include a first cap piece 710, a second cap piece 712, a plate 714, and cap fasteners 720 to fasten the first cap piece 710, the second cap piece 712, and the plate 714. The cap may include a threaded portion 716. The threaded portion 716 may be used to engage the cap connector 232. The cap may include a first cap threaded hole 722 and a second cap threaded hole 724 to receive the cap fasteners 720.

The first cap piece 710 and the second cap piece 712 may be identical to each other. The second cap piece 712 may be a rotated version of the first cap piece 710.

The plate 714 may define a plate hole for attaching the mechanical wire 130. The plate 714 may be a magnet. The magnet may be used by a magnetic sensor included in the CMS. In this way, the plate may serve multiple functions. It may be used to attach the mechanical wire 130 and it may also be used by a controller to locate a positioning of the mechanical wire 130 based on a sensed proximity of the magnet to the magnetic sensor. In at least some implementations, the magnet may be a ring magnet.

In some implementations, the cap 230 may not include the plate 714. The mechanical wire 130 may be attached to the first cap piece 710 and/or second cap piece 712.

The circumferential side of the cap 230 may have threads to be screwed or fitted into the cap connector 232. Put differently, the cap connector 232 may receive the cap 230 and securely tightened with enough friction that when the mechanical cable is retracted by the cable management system, the cap 230 and the cap connector 232 will not come apart or disengage. Other mechanisms of attachment of the cap 230 to the cap connector 232 may also be used.

The cap 230 may also be called a wire receiver.

In the illustrated example, the cable holder 110 may include a cap 230, or a wire receiver, and the cable holder may define a hole on the top side to receive the cap 230. For example, the cap may mate with the hole through a threaded connection and the cap may be rotated in one direction relative to the hole in order to connect the cap to the cable holder 110. Further, it may be rotated in a second direction relative to the cable holder 110 in order to disconnect the cap from the hole. The cap may be disconnected in order to, for example, fasten the mechanical wire 130 to the cable holder in the field. For example, the mechanical wire may be placed through the cap and it may be tied off or attached to a cable holder such as a clamp, including, for example, a wire clamp.

The cable holder 110 may include a sensing feature, such as a magnet. The sensing feature may be provided at or near the top side. For example, the magnet may be placed within the cap 230. In the illustrated example, the magnet is a ring magnet that defines a hole through which the mechanical wire 130 may pass.

The plate 714 may be a magnet sensed by a sensor, such as a terminal position sensor that is situated to detect the magnet when the mechanical wire 130 is fully retracted. For example, the terminal position sensor may be situated to detect when the cable holder 110 is near the enclosure. In at least some implementations, the terminal position sensor may be a magnetic sensor which senses the magnet. The terminal position sensor may, in at least some implementations, be situated at or near an outlet port of an enclosure.

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A cable holder comprising:
- a housing defining a primary interior slot;
- a primary coupler disposed within the housing, the primary coupler including:
  - an exterior collar for coupling the primary coupler to the housing by engagement with the primary interior slot, the exterior collar being rotatable within the primary interior slot;
  - a rigid portion having one or more gripping features for gripping a cable; and
  - a compressible portion situated between the exterior collar and the rigid portion for coupling the exterior collar to the rigid portion to allow the cable to rotate within the housing; and
- a first secondary coupler situated at a first end of the housing, the first secondary coupler rotatably coupled to the housing at a first interior slot, the first secondary coupler defining a first interior hole for receiving the cable.

2. The cable holder of claim 1, wherein the gripping features of the rigid portion include one or more of: barbs, spikes, teeth, claws, and notches.

3. The cable holder of claim 1, wherein the housing includes a first housing piece and a second housing piece, the first housing piece being detachable from the second housing piece to allow for insertion of the primary coupler in the primary interior slot.

4. The cable holder of claim 1, wherein the exterior collar includes a first exterior collar piece and a second exterior collar piece, the first exterior collar piece being detachable from the second exterior collar piece to allow the exterior collar to be placed around the cable.

5. The cable holder of claim 4, wherein the first and second exterior collar piece includes a tightening feature for tightening the first and second exterior collars and fix the rigid portion to the first and second exterior collar pieces by compressing the compressible portion.

6. The cable holder of claim 1, wherein the rigid portion includes a first rigid piece and a second rigid piece to allow the exterior collar to be placed around the cable.

7. The cable holder of claim 1, wherein the compressible portion includes a first compressible portion and a second compressible portion to allow the exterior collar to be placed around the cable.

8. The cable holder of claim 1, wherein the compressible portion is constructed with one or more of: silicone and rubber.

9. The cable holder of claim 1, wherein an inner diameter of the rigid portion corresponds to an outer diameter of the cable.

10. The cable holder of claim 1, wherein the primary coupler is situated in a middle of the housing.

11. The cable holder of claim 1, further comprising:
- a second secondary coupler situated at a second end of the housing, the second secondary coupler rotatably coupled to the housing at a second interior slot, the second secondary coupler defining a second interior hole for receiving the cable.

12. The cable holder of claim 11, wherein the secondary couplers each include a first secondary coupler piece and a second secondary coupler piece to allow the secondary couplers to be placed around the cable.

13. The cable holder of claim 12, wherein the secondary couplers include a linking mechanism to couple the first secondary coupler piece and the second secondary coupler piece.

14. The cable holder of claim 13, wherein the first secondary coupler and the second secondary coupler include one or more gripping features for gripping the cable.

15. A cable holder comprising:
- a housing defining a primary interior slot;
- a primary coupler disposed within the housing, the primary coupler including:
  - an exterior collar for coupling the primary coupler to the housing by engagement with the primary interior slot, the exterior collar being rotatable within the primary interior slot;
  - a rigid portion having one or more gripping features for gripping a cable; and
  - a compressible portion situated between the exterior collar and the rigid portion for coupling the exterior collar to the rigid portion to allow the cable to rotate within the housing;
- a cap defining a hole for attaching a mechanical wire to the cable holder; and
- a cap connector in the housing coupled to the cap.

16. The cable holder of claim 15, wherein the cap includes:
- a first cap piece, a second cap piece, a plate defining a plate hole for attaching the mechanical wire, and one or more fasteners to fasten the first cap piece, the second cap piece, and the plate.

17. A cable holder comprising:
- a housing defining a primary interior slot;
- a primary coupler disposed within the housing, the primary coupler including:

an exterior collar for coupling the primary coupler to the housing by engagement with the primary interior slot, the exterior collar being rotatable within the primary interior slot;

a rigid portion having one or more gripping features for gripping a cable; and a compressible portion situated between the exterior collar and the rigid portion for coupling the exterior collar to the rigid portion to allow the cable to rotate within the housing, wherein the exterior collar, the rigid portion, and the compressible portion of the primary coupler includes an alignment mechanism to prevent misalignment.

18. The cable holder of claim 1, wherein the cable is liquid cooled or air cooled.

* * * * *